2,905,550

RECOVERY OF REFRACTORY METALS

Donald F. Taylor, Waukegan, Robert L. Baughman, Zion, and Leonard F. Yntema, Wadsworth, Ill., assignors to Fansteel Metallurgical Corporation, a corporation of New York No Drawing. Application October 14, 1957
Serial No. 689,767

14 Claims. (Cl. 75—84)

This invention relates to a method of recovering refractory metals from their ores and from intermetallic compounds or alloys of the refractory metals with other metals. The invention particularly relates to recovery of refractory metals such as tantalum, columbium, tungsten and molybdenum and the like.

This application is a continuation-in-part of our copending United States patent application Serial No. 239,-392, filed July 30, 1951, now abandoned.

In the case of tantalum and columbium, these metals cannot be recovered from tantalite, columbite and similar ores by a smelting process and the metals cannot be obtained by a reduction of the oxides with hydrogen. These ores are fused with caustic soda which converts the tantalum and columbium into crude sodium tantalate and sodium columbate mixed with various impurities. After cooling the fused mass, the mass is crushed and the water soluble impurities are removed by leaching with water. Acid soluble impurities are removed by treatment with hot hydrochloric acid which converts the sodium tantalate and sodium columbate into insoluble tantalic and columbic acids. The mixture of acids is then dissolved in hot hydrofluoric acid and potassium carbonate added to form the double salts, potassium tantalum fluoride and potassium columbium oxyfluoride. The hot solution is cooled whereby the potassium tantalum fluoride crystallizes leaving the potassium columbium oxyfluoride in solution. The tantalum salt is washed and dried and the columbium salt recovered from the solution.

This method of preparing the relatively pure salts is efficient and economical. The metals are obtained by electrolysis of the respective fused salts, the metal being dispersed as fine grains or powder in the salt mass. After electrolysis, the salt mass is crushed and the metal recovered from the crushed mass.

Also, the salts may be converted to oxides by treating the same with an alkaline solution such as sodium hydroxide after which the resulting salt is washed and then treated with an acid such as hydrochloric acid after which the resulting powder is washed. When tantalum is treated this way the resulting oxide is a hydrated oxide ($Ta_2O_5$—$H_2O$).

When the pure tantalum and columbium metals are obtained by electrolysis, the metal becomes dispersed as fine grains or powder in the salt mass as electrolysis progresses. After electrolysis, the salt mass is crushed and the metal recovered from the crushed mass.

The electrolysis of the fused tantalum or columbium metal salts is a costly operation. Recovery of the tantalum or columbium metal from the oxides thereof is also a costly operation. The new method of this invention provides a more economical means for the production of tantalum and columbium and eliminates many of the costly steps heretofore used in recovering the metals from the salts or oxides.

In our copending United States patent application, Serial Number 534,609, filed September 15, 1955, now abandoned, which is a continuation-in-part of our United States patent applications, Serial Number 195,910, filed November 15, 1950, now abandoned, and Serial Number 239,391, filed July 30, 1951, now abandoned, we have disclosed and claimed a method for the recovery of refractory metals including tantalum and columbium whereby the double salt of tantalum or columbium (as for example potassium tantalum fluoride and potassium columbium oxyfluoride) is first reacted with aluminum forming an intermetallic compound or alloy of aluminum and tantalum or columbium. The intermetallic compound or alloy is reacted with a third metal, such as copper, silver or gold which is substantially insoluble in the tantalum or columbium, but which alloys with the aluminum. As a result, the tantalum or columbium is obtained in substantially pure form as finely divided particles dispersed throughout the aluminum-third metal alloy.

We have discovered that the tantalum or columbium can be recovered from the aluminum-tantalum intermetallic compound or alloy or the aluminum-columbium intermetallic compound or alloy by treating the same with copper chloride. The copper chloride reacts with the aluminum of the intermetallic compound or alloy and the tantalum or columbium, being insoluble in the copper which is freed during the reaction, becomes dispersed throughout the copper as fine particles thereof.

The aluminum-tantalum alloy or the aluminum-columbium alloy may be recovered and purified and subsequently treated with the copper chloride, or the mass resulting from the reduction of the double salts with aluminum may be treated directly with copper chloride. Certain advantages result from the recovery of the aluminum-tantalum or aluminum-columbium alloy prior to the treatment with the copper chloride in that the alloy may be purified to some extent. On the other hand the alternative method may be employed to effect certain economies in the power required for heating.

To simplify the description of the new method, reference is made specifically to the preparation of tantalum and columbium from potassium tantalum fluoride, tantalum oxide, potassium columbium oxyfluoride and columbium pentoxide. It is understood that the method is applicable to other compounds of tantalum and columbium. It is to be understood also that the new method is applicable to other metals, and particularly other refractory metals such as molybdenum, tungsten and the like.

In the recovery of tantalum, the tantalum is first recovered from the potassium tantalum fluoride or the oxide by a reduction of the compound with aluminum. The aluminum is melted in a suitable crucible or container, for example a graphite crucible, and the tantalum compound is gradually added to the molten aluminum. The molten mass may be agitated by the use of a graphite rod, so as to insure contact of all of the compound with the molten aluminum. The reaction between the compound and molten aluminum is exothermic and no external heat is required during the course of the addition of the compound. The reaction between the salt and molten aluminum forms an aluminum-tantalum alloy or intermetallic compound, potassium fluoride and aluminum fluoride. The reaction between the oxide and the molten aluminum also forms an aluminum-tantalum alloy or intermetallic compound, an alkali metal halide and aluminum halide since an alkali metal halide is added to the tantalum oxide prior to or during the addition of the oxide to the molten aluminum. These halides form a slag which is substantially free of tantalum but which removes some impurities associated with the tantalum compound.

The reaction or reduction of potassium tantalum fluoride with aluminum may be represented by the following theoretical equation:

$$3K_2TaF_7 + 14Al \rightarrow 3Al_3Ta + 6KF + 5AlF_3$$

In the practice of this reaction an excess of aluminum is employed. The efficiency of this reduction or reaction with respect to the recovery of tantalum is excellent, in most instances exceeding 90%. This step in the recovery method may be illustrated by the following example:

*Example 1*

3400 parts by weight of aluminum in the form of pellets or shot were melted in a graphite crucible and heated to approximately 1000° C. 5000 parts by weight of potassium tantalum fluoride were added in 400 part lots over a period of about 30 minutes, the melt being stirred with a graphite rod after each addition of the potassium tantalum fluoride. No external heat is required during this period because of the heat resulting from the reaction.

After all of the fluoride had been added, the melt was maintained at a temperature of between 1000° C. and about 1450° C. for about 1 hour, being agitated at 15 minute intervals. The slag was removed and about 1600 parts by weight of potassium chloride added. The heating continued for about 15 minutes. During this period the molten mass was agitated so as to remove the residual slag from the molten metal.

The molten potassium chloride was then removed and the metallic mass allowed to solidify and cool. The free aluminum in the ingot was dissolved with a hydrochloric acid solution and the resulting aluminum-tantalum alloy or compound in the form of powder was washed free of acid, dried and screened. The yield was approximately 94%.

The aluminum-tantalum alloy or compound, as noted above corresponds to an intermetallic compound or alloy which we believe has the formula $Al_3Ta$ even though an excess of aluminum is employed. The tantalum cannot be recovered from this alloy by removal of the aluminum as by treatment with acids or by heating the material in a high vacuum to vaporize the aluminum.

*Example 2*

Example 1 was repeated except that 3000 parts by weight of tantalum oxide and 2000 parts by weight of potassium fluoride were mixed and substituted for the 5000 parts of potassium tantalum fluoride of Example 1.

The results were substantially the same as the results in Example 1. The yield was substantially in excess of 90%.

Tests similar to those set forth in Examples 1 and 2 inclusive were repeated except that potassium columbium oxyfluoride was used in place of potassium tantalum fluoride, and columbium oxide in place of tantalum oxide, the ratio of potassium columbium oxyfluoride or the mixture of columbium oxide and potassium fluoride to aluminum being 1:1. The results were quite satisfactory.

We have discovered that the tantalum and columbium may be removed or separated from the intermetallic compound or alloy thereof with aluminum by treating the intermetallic compound or alloy with copper chloride. The copper chloride reacts with the intermetallic compound or alloy to form aluminum chloride and releases the copper and the tantalum or columbium. The tantalum and columbium, respectively, are insoluble in copper and become dispersed throughout the copper as minute grains, crystals or particles.

The copper may be dissolved by means of a suitable acid solution and the tantalum or columbium is then recovered in the form of a powder. This reaction and separation effect a further reduction in impurities which may be present in and associated with the aluminum-tantalum or columbium intermetallic compound or alloy.

The reaction of aluminum-tantalum and copper may be illustrated by the following theoretical equation:

$$Al_3Ta + 9CuCl \rightarrow 3AlCl_3 + 9Cu + Ta$$

In practice, however, an excess of copper chloride is employed to insure substantially complete reduction.

An aluminum-tantalum alloy as prepared from the tantalum salt or oxide is in the form of a fine powder and may be employed in such form for the recovery of the tantalum. The finely divided alloy may be mixed with copper chloride and the mixture heated in a suitable crucible or container. As the reaction proceeds additional quantities of the mixture may be added. It is also satisfactory to fuse the copper chloride and add the finely divided alloy in small amounts until the desired quantities of the reactants have been introduced. If desired, the copper chloride may be added slowly to the molten aluminum-tantalum alloy.

As a further alternative, copper chloride may be fused and after the desired amount of alloy has been introduced, further quantities of a mixture of copper chloride and the alloy may be slowly added. In conducting this reaction, the mass is preferably covered by a low melting flux or slag, such as sodium chloride, potassium chloride, magnesium chloride or a mixture of these chlorides so as to protect the mass, particularly the tantalum, from the atmosphere. In this smelting or reaction it is preferable to employ an excess of copper chloride so as to insure a more complete recovery or removal of the tantalum, and we have found that a ratio of the aluminum-tantalum alloy to copper chloride of about 1:4 is satisfactory.

After the reaction is complete and the mass has cooled, it is removed from the crucible, most of the slag remaining on the surface of the ingot removed mechanically and the balance removed by dissolving in water. The ingot is then dissolved in nitric acid to dissolve the copper and the tantalum powder washed free of acids and dried.

The reduction of columbium by reacting an intermetallic compound or alloy of columbium and aluminum with copper chloride and the recovery of columbium from the resulting copper matrix is substantially the same as that described above in conjunction with the aluminum-tantalum intermetallic compound or alloy. Also, the results are substantially the same.

The method of separating aluminum and tantalum or the recovery of the tantalum from the aluminum-tantalum alloy is specifically illustrated by the following examples.

*Example 3*

Five parts of finely divided aluminum-tantalum alloy, 20 parts of finely divided cuprous chloride and 20 parts of barium chloride were intimately mixed. The mixture was introduced into a crucible and heated to about 700° C. and maintained at such temperature for about 20 minutes. After the mass cooled the salt slag was removed and the tantalum recovered by dissolving the copper by the use of nitric acid.

*Example 4*

25 parts of cuprous chloride were fused in a crucible and the molten salt covered with about 25 parts of a low melting point flux consisting of a mixture of magnesium, potassium and sodium chlorides. The mass was maintained at about 600° C. and about 6 parts of finely divided aluminum-tantalum alloy were slowly added, the entire mass being agitated after each addition of the alloy. The material was maintained at the elevated temperature for about 20 minutes after the final addition of the alloy. After the mass cooled, the slag was removed and the tantalum recovered by dissolving the copper with nitric acid.

Examples 3 and 4 were repeated except that finely divided aluminum-columbium intermetallic compound or alloy was used in place of the aluminum-tantalum intermetallic compound or alloy set forth in Examples 3 and 4. The results were substantially the same as the results of Examples 3 and 4.

The foregoing detailed description has been given for clarification of understanding only, and no unnecessary limitations should be understood therefrom, for some modification will be obvious to those skilled in the art.

We claim:

1. The method of recovering a metal selected from the group consisting of tantalum, columbium, molybdenum and tungsten from an inorganic compound thereof that is substantially completely reducible by aluminum to a metal, which comprises heating said inorganic compound of the selected metal with aluminum to form an alloy of the selected metal and aluminum, heating the aluminum-selected metal alloy with copper chloride to form a mix of copper and the selected metal in a finely divided state, the copper being capable of dissolving aluminum and incapable of dissolving the selected metal, and separating the finely divided selected metal from the copper-selected metal mix.

2. The method of recovering a metal selected from the group consisting of tantalum, columbium, molybdenum and tungsten from an inorganic compound thereof that is substantially completely reducible by aluminum to a metal, which comprises heating said inorganic compound of the selected metal with aluminum to form an alloy of the selected metal and aluminum, heating the aluminum-selected metal alloy with cuprous chloride to form a mix of copper and the selected metal in a finely divided state, the copper being capable of dissolving aluminum and incapable of dissolving the selected metal, and separating the finely divided selected metal from the copper-selected metal mix.

3. The method of recovering a metal selected from the group consisting of tantalum, columbium, molybdenum and tungsten from an alloy of the selected metal and aluminum, comprising heating the said aluminum alloy with copper chloride to form a mix of copper and the selected metal in a finely divided state, the copper being capable of dissolving aluminum and incapable of dissolving the selected metal, and separating the selected metal from the finely divided copper-selected metal mix.

4. The method of recovering a metal selected from the group consisting of tantalum, columbium, molybdenum and tungsten from an alloy of the selected metal and aluminum, comprising heating the said aluminum alloy with cuprous chloride to form a mix of copper and the selected metal in a finely divided state, the copper being capable of dissolving aluminum and incapable of dissolving the selected metal, and separating the selected metal from the finely divided copper-selected metal mix.

5. The method of recovering tantalum from an alloy of tantalum and aluminum comprising heating the aluminum-tantalum alloy with cuprous chloride to form a mix of copper and tantalum in a finely divided state, the copper being capable of dissolving aluminum and incapable of dissolving the tantalum, and separating the finely divided tantalum from the copper-tantalum mix.

6. The method of recovering columbium from an alloy of columbium and aluminum comprising heating the aluminum-columbium alloy with cuprous chloride to form a mix of copper and columbium in a finely divided state, the copper being capable of dissolving aluminum and incapable of dissolving the columbium, and separating the finely divided columbium from the copper-columbium mix.

7. The method of recovering a metal selected from the group consisting of tantalum, columbium, molybdenum and tungsten from a double fluoride of an alkali metal and the selected metal, which comprises heating said double fluoride of an alkali metal and the selected metal with an excess of aluminum to form an alloy of aluminum and the selected metal, heating the aluminum-selected metal alloy with copper chloride to form a mix of copper and the selected metal in a finely divided state, the copper being capable of dissolving aluminum and incapable of dissolving the selected metal, and separating the finely divided selected metal from the copper-selected metal mix, said double fluoride being substantially completely reducible to a metal by aluminum.

8. The method of recovering a metal selected from the group consisting of tantalum, columbium, molybdenum and tungsten from a double fluoride of potassium and the selected metal, which comprises heating said double fluoride of potassium and the selected metal with an excess of aluminum to form an alloy of aluminum and the selected metal, heating the aluminum-selected metal alloy with cuprous chloride to form a mix of copper and the selected metal in a finely divided state, the copper being capable of dissolving aluminum and incapable of dissolving the selected metal, and separating the finely divided selected metal from the copper-selected metal mix, said double fluoride being substantially completely reducible to a metal by aluminum.

9. The method of preparing tantalum which comprises heating a double fluoride of potassium and tantalum with aluminum to form an alloy of aluminum and tantalum, heating the aluminum-tantalum alloy with cuprous chloride to form a mix of copper and tantalum in a finely divided state, the copper being capable of dissolving aluminum and incapable of dissolving the tantalum, and separating the finely divided tantalum from the copper-selected metal mix, said double fluoride being substantially completely reducible to a metal by aluminum.

10. The method of preparing columbium which comprises heating a double fluoride of potassium and columbium with aluminum to form an alloy of aluminum and columbium, heating the aluminum-columbium alloy with cuprous chloride to form a mix of copper and columbium in a finely divided state, the copper being capable of dissolving aluminum and incapable of dissolving the columbium, and separating the finely divided columbium from the copper-selected metal mix, said double fluoride being substantially completely reducible to a metal by aluminum.

11. The method of recovering a metal selected from the group consisting of tantalum, columbium, molybdenum and tungsten from an oxide thereof which comprises heating said oxide of the selected metal with aluminum to form an alloy of the selected metal and aluminum, heating the aluminum-selected metal alloy with copper chloride to form a mix of copper and the selected metal in a finely divided state, the copper being capable of dissolving aluminum and incapable of dissolving the selected metal, and separating the finely divided selected metal from the copper-selected metal mix, said oxide being substantially completely reducible to a metal by aluminum.

12. The method of recovering a metal selected from the group consisting of tantalum, columbium, molybdenum and tungsten from an oxide thereof which comprises heating said oxide of the selected metal with aluminum to form an alloy of the selected metal and aluminum, heating the aluminum-selected metal alloy with cuprous chloride to form a mix of copper and the selected metal in a finely divided state, the copper being capable of dissolving aluminum and incapable of dissolving the selected metal, and separating the finely divided selected metal from the copper-selected metal mix, said oxide being substantially completely reducible to a metal by aluminum.

13. The method of preparing tantalum which comprises heating an oxide of tantalum with aluminum to form an alloy of aluminum and tantalum, heating the aluminum-tantalum alloy with cuprous chloride to form a mix of copper and tantalum in a finely divided state, the copper being capable of dissolving aluminum and incapable of dissolving the tantalum, and separating the finely divided tantalum from the copper-selected metal mix, said oxide being substantially completely reducible to a metal by aluminum.

14. The method of preparing columbium which comprises heating an oxide of columbium with aluminum to form an alloy of aluminum and columbium, heating the aluminum-columbium alloy with cuprous chloride to form a mix of copper and columbium in a finely divided state, the copper being capable of dissolving aluminum and incapable of dissolving the columbium, and separating the finely divided columbium from the copper-selected metal mix, said oxide being substantially completely reducible to a metal by aluminum.

References Cited in the file of this patent

UNITED STATES PATENTS

| | | |
|---|---|---|
| 324,659 | Cowles et al. | Aug. 18, 1885 |
| 1,022,599 | Rossi | Apr. 9, 1912 |
| 1,042,694 | Ladoff | Oct. 29, 1912 |
| 1,321,684 | Turner et al. | Nov. 11, 1919 |
| 1,373,038 | Weber | Mar. 29, 1921 |
| 1,644,000 | Shumaker | Oct. 4, 1927 |
| 1,648,954 | Marden | Nov. 5, 1927 |
| 2,030,357 | Doom | Feb. 11, 1936 |
| 2,031,486 | Kinsebom | Feb. 18, 1936 |
| 2,183,517 | Leemaus | Dec. 12, 1939 |
| 2,205,854 | Kroll | June 25, 1940 |
| 2,239,277 | Stroup | Apr. 22, 1941 |
| 2,241,514 | Jaeger et al. | May 13, 1941 |
| 2,296,196 | Behr | Sept. 15, 1942 |
| 2,516,863 | Gardener | Aug. 1, 1950 |

FOREIGN PATENTS

| | | |
|---|---|---|
| 536,258 | Great Britain | May 8, 1941 |

OTHER REFERENCES

Kroll: Metal Industry, October 22, 1948, pp. 323–325.

Hansen: "Aufbau der Zweistofflegierungen," by Edwards Bros., Inc., Ann Arbor, Mich., 1943, pp. 1–3, 103, 264, and 650.

Rolfe: Dictionary of Metallography. Published 1955 by Chemical Publ. Co., New York, N.Y., pages 7 and 139.